(12) United States Patent
Wu et al.

(10) Patent No.: US 8,654,556 B2
(45) Date of Patent: Feb. 18, 2014

(54) REGISTERED DIMM MEMORY SYSTEM

(75) Inventors: Larry Wu, Sunnyvale, CA (US); Gang Shan, Shanghai (CN); Yibo Jiang, Shanghai (CN)

(73) Assignee: Montage Technology Inc., San Jose, CA (US)

( * ) Notice: Subject to any disclaimer, the term of this patent is extended or adjusted under 35 U.S.C. 154(b) by 50 days.

(21) Appl. No.: 12/185,239

(22) Filed: Aug. 4, 2008

(65) Prior Publication Data

US 2009/0248969 A1 Oct. 1, 2009

Related U.S. Application Data

(60) Provisional application No. 61/041,223, filed on Mar. 31, 2008.

(51) Int. Cl.
*G11C 5/02* (2006.01)

(52) U.S. Cl.
USPC .................... 365/51; 365/189.17; 365/233.13; 710/305; 710/306; 710/310

(58) Field of Classification Search
USPC ............ 365/51, 189.17, 189.05, 191, 189.12, 365/233.13
See application file for complete search history.

(56) References Cited

U.S. PATENT DOCUMENTS

| | | | |
|---|---|---|---|
| 6,502,161 B1 * | 12/2002 | Perego et al. | 711/5 |
| 2003/0090879 A1 * | 5/2003 | Doblar et al. | 361/728 |
| 2005/0138519 A1 | 6/2005 | Boutillon et al. | |
| 2007/0070669 A1 * | 3/2007 | Tsern | 365/51 |
| 2007/0088995 A1 * | 4/2007 | Tsern et al. | 714/724 |

OTHER PUBLICATIONS

JEDEC Standard, Definition of the SSTE32882 Registering Clock Drive with Parity and Quad Chip Selects for DDR3 RDIMM Applications, JEDS XX-X, Item #104, Apr. 2008.

* cited by examiner

*Primary Examiner* — Thao Bui
(74) *Attorney, Agent, or Firm* — Ivy Mei; The Law Office of Ivy Mei (57) ABSTRACT

A Registered DIMM (RDIMM) system with reduced electrical loading on the data bus for increases memory capacity and operation frequency. In one embodiment, the data bus is buffered on the DIMM. In another embodiment, the data bus is selectively coupled to a group of memory chips via switches.

17 Claims, 9 Drawing Sheets

REGISTERED DIMM MEMORY SYSTEM

RELATED APPLICATION

The present application claims priority to a provisional U.S. Patent Application Ser. No. 61/041,223, filed on Mar. 31, 2008, entitled "Registered DIMM Memory System", the disclosure of which is hereby incorporated herein by reference.

FIELD OF THE TECHNOLOGY

At least some embodiments of the disclosure relate to memory systems of a data processing system in general, and particularly but not limited to, registered Dual In-line Memory Module (DIMM).

BACKGROUND

A registered Dual In-line Memory Module (DIMM) has a Register Buffer chip on the memory module to receive address/command signals from the memory controller into a latch and then send them out to the Dynamic Random Access Memory (DRAM) chips on the registered DIMM module.

In a system using a conventional registered DIMM module, memory chips are connected to the data bus directly. A memory controller drives the memory chips over the data bus.

SUMMARY OF THE DESCRIPTION

Described herein is a Registered DIMM (RDIMM) system with reduced electrical loading on the data bus for increases memory capacity and the operation frequency. In one embodiment, the data bus is buffered on the DIMM. In another embodiment, the data bus is selectively coupled to a group of memory chips via switches.

In one aspect, a registered Dual In-line Memory Module, includes: a printed circuit board having a plurality of electrical contacts for connection to a data bus; a plurality of memory chips mounted on the printed circuit board; and an electrical load reduction circuit coupled between the electrical contacts and the memory chips to write data received from the data bus into the memory chips or to read data from the memory chips onto the data bus, an electrical load of the memory chips on the data bus being smaller with the memory chips being coupled to the data bus via the electrical load reduction circuit than connecting the memory chips directly to the data bus.

In one embodiment, the electrical load reduction circuit includes a data bus buffer to buffer data transmitted between the memory chips and the data bus. In one embodiment, the data bus buffer drives a bit of data received from the data bus to multiple of the memory chips via multiple one to one connections provided on the printed circuit board. In another embodiment, the data bus buffer drives a bit of data received from the data bus to multiple of the memory chips via a one to many connection provided on the printed circuit board.

In one embodiment, the electrical load reduction circuit includes a data bus switch which selectively couples the data bus to a subset of the memory chips and isolates a subset of the memory chips from the data bus.

In another aspect, a memory system includes: a data bus; a memory controller coupled to the data bus; and at least one Dual In-line Memory Module (DIMM) having a plurality of memory chips and an electrical load reduction circuit coupled between the data bus and the memory chips. The data bus is to transmit data into or from the memory chip; and the electrical load reduction circuit is to enable the memory controller to access the memory chips with an electrical load smaller than connecting the memory chips to the data bus without the electrical load reduction circuit.

In one embodiment, the memory system further includes a register buffer mounted on the DIMM and connected to a control bus to buffer control signals from the memory controller to the memory chips. In one embodiment, the control signals include chip selection signals.

In one embodiment, the memory system further includes: a control signal generator mounted on the DIMM to generate a control signal for the electrical load reduction circuit according to the control signals received in the register buffer.

In one embodiment, the control signal generator and the electrical load reduction circuit are disposed in separate integrated circuit chips; and the control signal generator includes an encoder to compress a plurality of signals for transmission over a plurality of control lines between the separate integrate circuit chips.

In one embodiment, the electrical load reduction circuit buffers data from the data bus or includes a switch array to selectively couple a portion of the memory chips to the data bus.

In another aspect, a memory apparatus includes: a plurality of memory chips; and a circuit coupled to data pins of the memory chips. When connected via the circuit the data pins of the memory chips generate a less electrical load on a memory controller than being connected to the memory controller without the circuit.

In one embodiment, the circuit includes an array of buffers to buffer data signals from the memory chips. In another embodiment, the circuit includes an array of switches to selectively connect a group of the memory chips and disconnect a group of the memory chips.

In another aspect, an integrated circuit chip includes: a register buffer to buffer and re-drive command, address, control and clock signals from a memory bus including a data bus; and an encoder to generate a control signal for a circuit to buffer the data bus or to selectively couple memory chips to the data bus.

In one embodiment, the integrated circuit chip further includes: a scheduler to control timing of an output of the encoder; a first timing control coupled with the scheduler to delay the output of the encoder one or more clock cycles; and a second timing control coupled with the first time control to delay the output of the encoder a fraction of a clock cycle. In one embodiment, the first timing control includes a delay chain and a multiplexer.

In one embodiment, the encoder compresses a plurality of control signals for transmission over a reduced number of pins of the integrated circuit chip.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the disclosure are not necessarily references to the same embodiment; and, such references mean at least one.

As the number of DRAM chips increases on a DIMM module, the electrical load generated by the DRAM chips on the memory control over the data bus increases. Thus, current registered DIMM systems allow only two DIMM modules attached to the memory controller over one memory channel. This limits the memory capacity of a data processing system.

One embodiment of the disclosure includes a new Registered DIMM system, which uses Data Bus Buffers/Switches on a DIMM module to buffer and drive the data bus and thus to reduce the electrical load generated on the memory controller over the data bus to drive the DRAM chips. In one embodiment, the Data Bus Buffers/Switches on the Registered DIMM are controlled by a CMD/CTRL Buffer for command and control signal. Such a registered DIMM allows a memory system to provide higher capacity and higher memory access speed than conventional memory systems.

Figure 1:
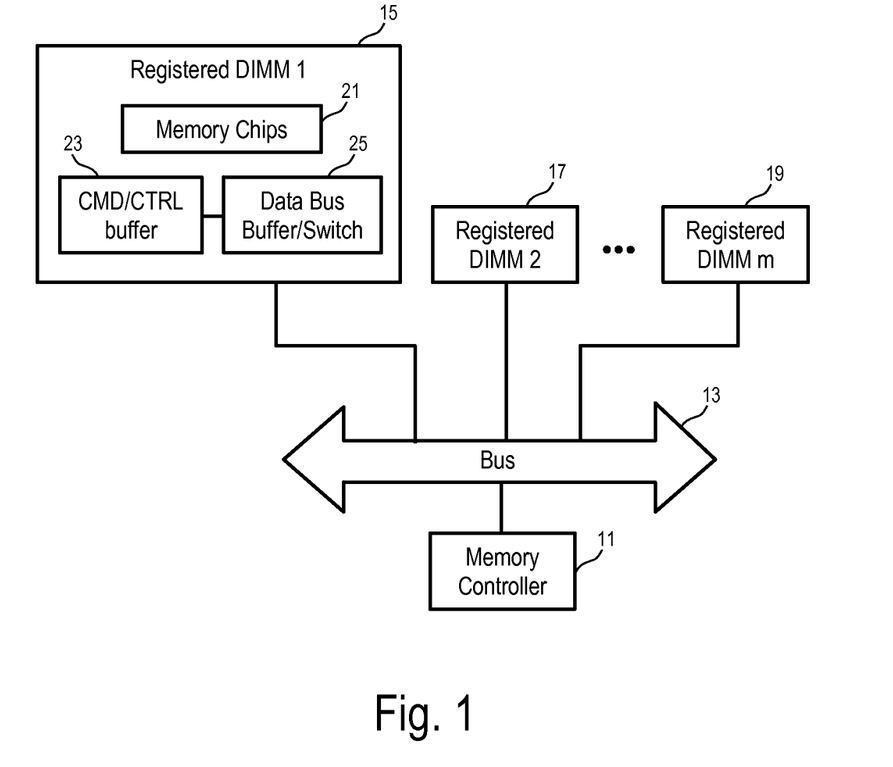
FIG. 1 shows a Registered DIMM memory system according to one embodiment.

FIG. 1 shows a Registered DIMM memory system according to one embodiment. In FIG. 1, a plurality of memory modules (e.g., registered DIMM 1, 2, . . . , m) (15, 17, . . . , 19) are connected to a memory controller via a common, shared bus (13). The bus (13) connects the memory controller (11) from one point to multiple points for the memory modules (15, 17, . . . , 19). In one embodiment, the bus (13) includes a data bus and a command/control bus. The command/control bus communicates command/control signals from the memory controller (11) to the memory modules (15, 17, . . . , 19) to read from or write into the memory modules (15, 17, . . . , 19); and the data bus communicates data between the memory modules (15, 17, . . . , 19) and the memory controller (11).

In FIG. 1, a memory module (15) has a data bus buffer/switch (25), a command/control (CMD/CTRL) signal buffer (23) and a plurality of memory chips (21). The data bus buffer/switch (25) used on the memory module (15) reduces the loading of the data bus; thus, the capacity and the clock frequency of the RDIMM memory system can be increased. In one embodiment, more than two DIMMs (15, 17, . . . , 19) are used on the common, shared bus (13). Memory modules (17, . . . , 19) other than the memory module (15) may also have a structure similar to the memory module (15). In some embodiments, memory modules (17, . . . , 19) other than the memory module (15) may include at least one conventional memory model that does not use a data bus buffer/switch.

In one embodiment, each of the registered DIMM modules uses a data bus buffer/switch. Alternatively, registered DIMM modules with or without a data bus buffer/switch can be mixed and used in the memory system.

In one embodiment, more than one data bus buffer/switch is used on a DIMM module to buffer different groups of memory chips.

In FIG. 1, CMD/CTRL buffer (23) is used to buffer the command signals, address signals, control signals and clock signals. The CMD/CTRL buffer (23) is further used to control the data bus buffer/switch (25) in buffering and driving the data bus, or in switching the connectivity between the memory chips (21) and the data bus. Thus, in FIG. 1, the command, address, control and clock signals are buffered by the CMD/CTRL buffer (23), while the data signals are buffered or switched by the data bus buffer/switch (25). The memory controller (11) is thus isolated from the memory chips (21) by the data bus buffer (25) or selectively connected to or disconnected from different portions of the memory chips (21) by the data bus switch (25). The CMD/CTRL buffers and data bus buffers/switches represent the virtual memories for the memory controller and virtual memory controllers for the memory chips on the respective memory modules.

In one embodiment, each registered DIMM (e.g., 15) has a printed circuit board. A plurality of memory chips (e.g., 21) are mounted on the printed circuit board. The printed circuit board has a number of electrical contacts for connection to a data bus for data signals and a control bus for control signals. The data signals are read from the memory chips or written into the memory chips. The control signals may include address signals, clock signals and other signals, such as chip selection signals.

In one embodiment, the CMD/CTRL buffer (23) and the data bus buffer switch (25) are also mounted on the printed circuit board of the registered DIMM (e.g., 15). In some embodiment, the CMD/CTRL buffer (23) and the data bus buffer switch (25) are disposed on separate integrated circuit chips. Alternatively, the CMD/CTRL buffer (23) and the data bus buffer switch (25) may be integrated on the same integrated circuit chip.

In FIG. 1, the bus (13) connecting between the memory controller (11) and the DIMMs (15, 17, . . . , 19) uses a one-to-many connection. Thus, the electrical load applied on the memory controller (11) is a function of the number of DIMMs (15, 17, . . . , 19) connected to the bus (13).

Figure 2:
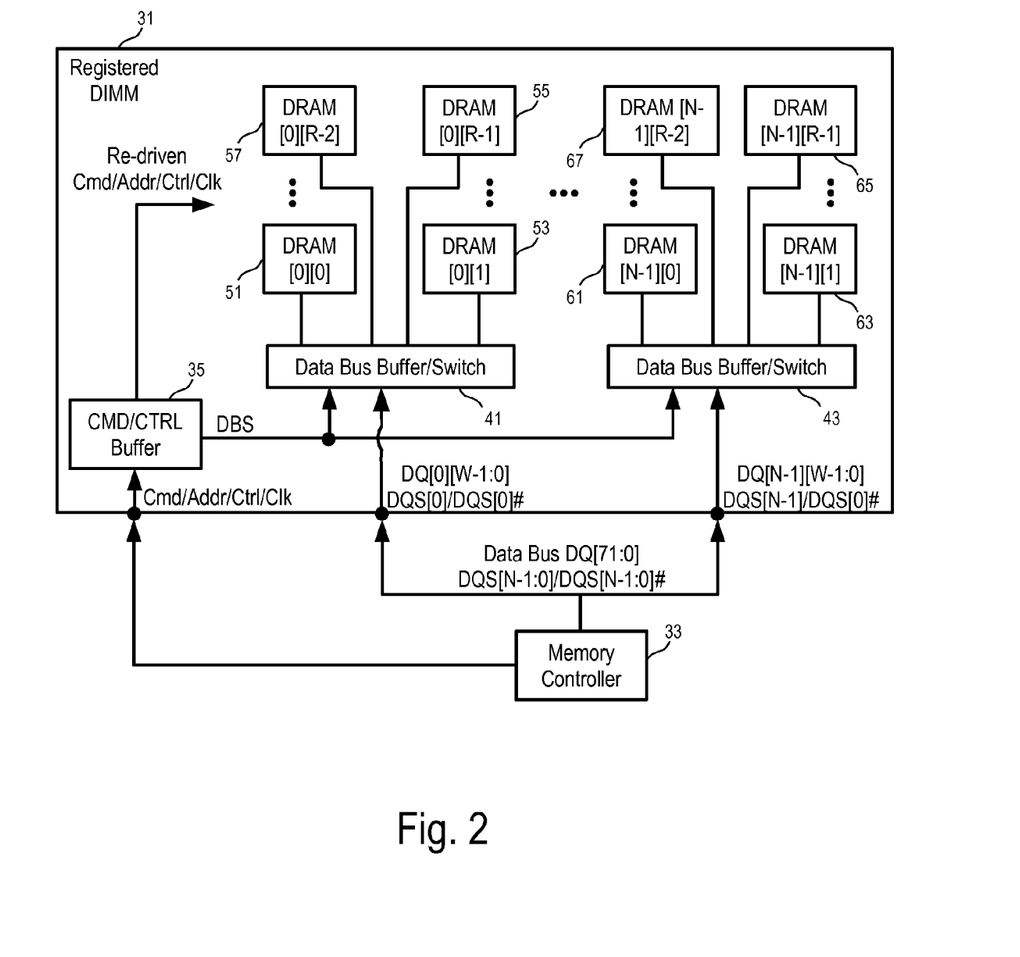
FIG. 2 shows a registered DIMM according to one embodiment.
Figure 3:
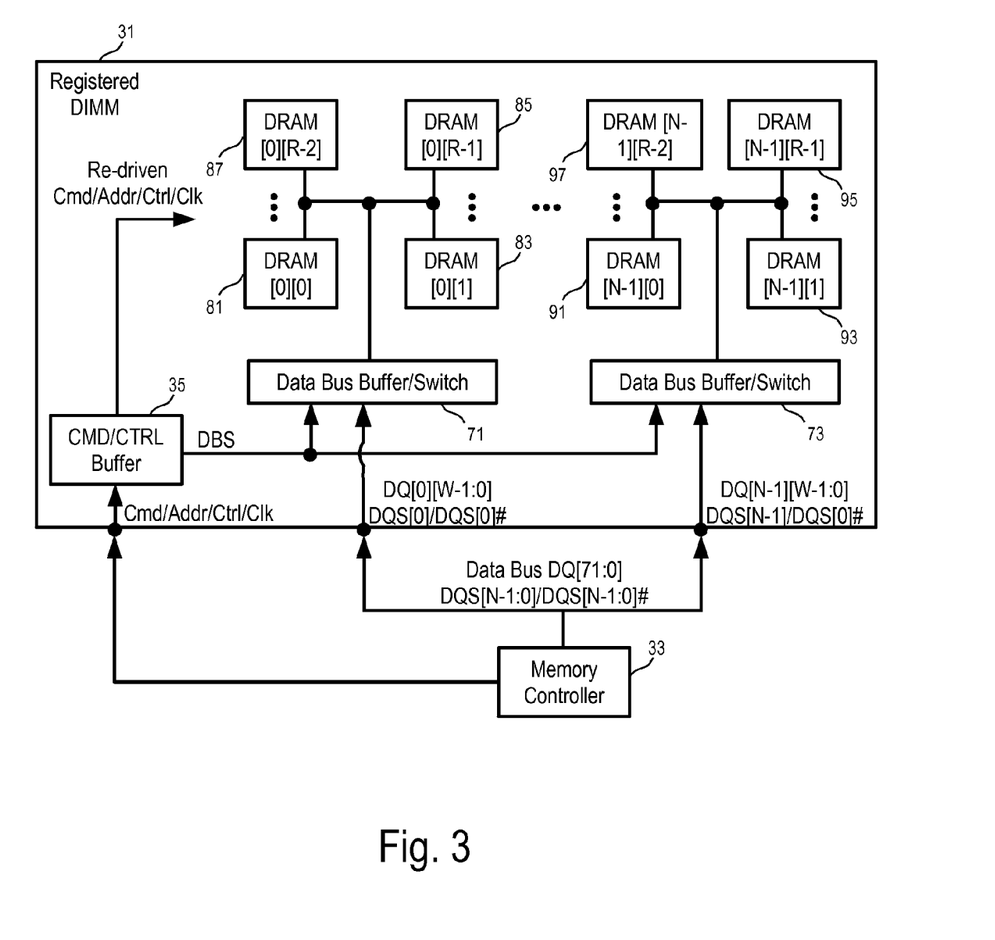
FIG. 3 shows a registered DIMM according to another embodiment.

FIGS. 2 and 3 show registered DIMMs according to different embodiments. In the examples illustrated in FIGS. 2 and 3, the data bus includes N groups of data signals; and each of the N groups of data signals has W parallel data signals. In the examples illustrated in FIGS. 2 and 3, each group of data signals (DQ[n][W-1:0]) are buffered by a Data Bus Buffer/Switch, where n=0, 1, . . . , N-1; N is the number of DRAM chip groups on a module; and W is the data width of DRAM chips (e.g., W=4, or 8, or 16, . . . ). In one embodiment, the data bus is 72 bits; and N=72/W. Other numbers for the DRAM chip groups and for the width of the data bus can also be used.

In one embodiment, each group of data signals (DQ[n][W-1:0]) are re-driven to the corresponding group of DRAM chips on the module (31). Each group has R DRAM chips, where R is the number of ranks on a module.

In FIG. 2, the connection between a Data Bus Buffer/Switch (e.g., 41) and the data pins of the DRAM chips (e.g., 51, 53, . . . , 55, 57) is point-to-point. For example, the data bus buffer/switch (41) buffers the data obtained from the data signal lines DQ[0][W-1:0] of the data bus and writes the data into one of the DRAM chips (51, 53, ..., 55 and 57) via a point-to-point connection according to the control signal (DBS) from the CMD/CTRL buffer (35). For example, the data bus buffer/switch (43) buffers the data read from one of the DRAM chips (51, 53, ..., 55 and 57) via a point-to-point connection according to the control signal (DBS) from the CMD/CTRL buffer (35) and puts the data on the data signal lines DQ[N-1][W-1:0] of the data bus for transmission to the memory controller (33).

In another embodiment, the data bus buffer/switches (41 ..., 43) selectively connect a rank of the DRAM chips for connection to the data bus and disconnect other DRAM chips from the data bus. For example, according to the control signal (DBS) from the CMD/CTRL buffer (35), the data bus buffer/switch (41) may connect the data signal lines DQ[0][W-1:0] to one of the point-to-point connections between the DRAM chips (51, 53, ..., 55 and 57) and the data bus buffer/switch (41) and disconnect other point-to-point connections between the DRAM chips (51, 53, ..., 55 and 57) and the data bus buffer/switch (41) from the data signal lines DQ[0][W-1:0]. Similarly, according to the control signal (DBS) from the CMD/CTRL buffer (35), the data bus buffer/switch (43) may connect the data signal lines DQ[N-1][W-1:0] to one of the point-to-point connections between the DRAM chips (61, 63, ..., 65 and 67) and the data bus buffer/switch (43) and disconnect other point-to-point connections between the DRAM chips (61, 63, ..., 65 and 67) and the data bus buffer/switch (43) from the data signal lines DQ[N-1][W-1:0]. In one embodiment, the data bus buffer/switches (41 ..., 43) connect the same rank of DRAM chips selected according to the control signal (DBS) from the CMD/CTRL buffer (35) to the data bus and disconnect DRAM chips of other ranks from the data bus. Alternatively, the control signal (DBS) from the CMD/CTRL buffer (35) may include indications of different ranks of DRAM chips to be connected to the data bus by different data bus buffer/switches (41 ..., 43).

In FIG. 3, the connection between a Data Bus Buffer/Switch (e.g., 71) and the data pins of the DRAM chips (e.g., 81, 83, ..., 85, 87) is from one point to multiple points. For example, the data bus buffer/switch (41) buffers the data obtained from the data signal lines DQ[0][W-1:0] of the data bus and writes the data into one of the DRAM chips (51, 53, ..., 55 and 57) via a bus connection according to the control signal (DBS) from the CMD/CTRL buffer (35). For example, the data bus buffer/switch (43) buffers the data read from one of the DRAM chips (51, 53, ..., 55 and 57) via a bus connection according to the control signal (DBS) from the CMD/CTRL buffer (35) and puts the data on the data signal lines DQ[0][W-1:0] of the data bus for transmission to the memory controller (33).

In FIGS. 2 and 3, the Data Bus Buffers/Switches (e.g., 41, ..., 43; 71, ..., 73) are controlled by the CMD/CTRL Buffer (35), which is designed based, at least in part, on the Register Buffer on a conventional RDIMM system in one embodiment. Further details are provided below.

Since the DRAM chips are not directly connected to the memory controller (33), the memory controller would see only the Data Bus/Buffers/Switchers (e.g., 41, ..., 43; or 71, ..., 73) on the data bus now instead of a plural of DRAM chips. This allows the system to have more DIMM modules per channel and thus increasing the memory capacity of the system.

Figure 4:
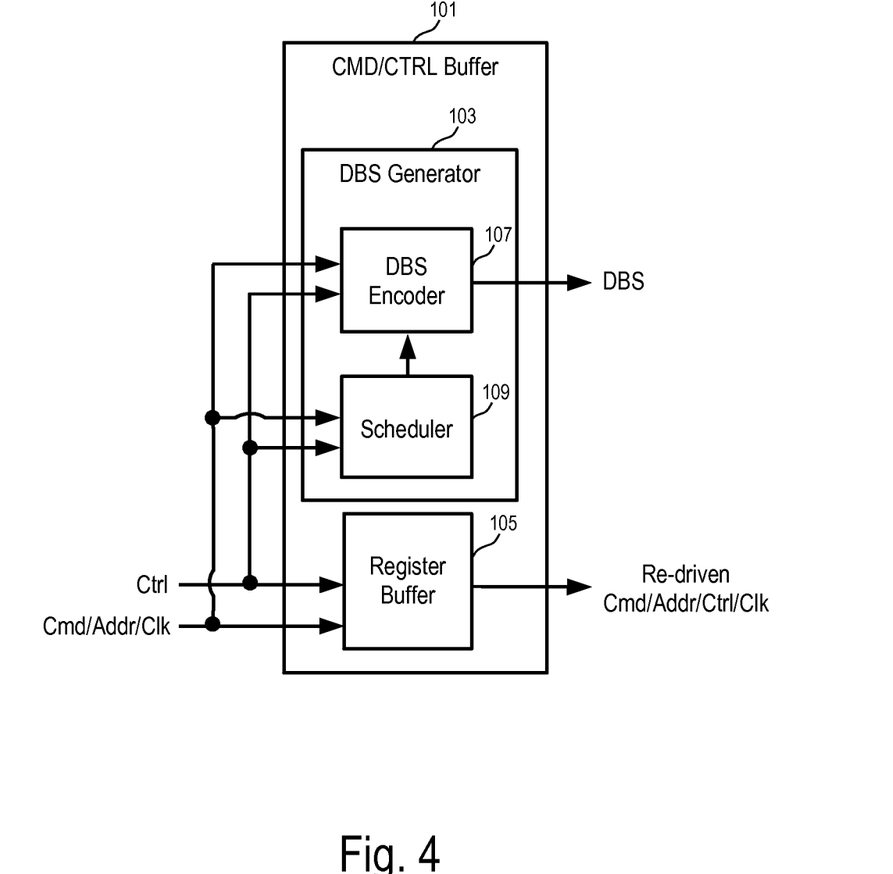
FIG. 4 shows a command/control buffer according to one embodiment.

FIG. 4 shows a command/control buffer according to one embodiment. In FIG. 4, the CMD/CTRL Buffer includes a Register Buffer (105) and a DBS Generator (103). In one embodiment, the functionality of the Register Buffer (105) is the same as a conventional Register Buffer. The DBS Generator (103) includes a DBS encoder (107) and a scheduler (109) to generate a group of control signals (DBS) for Data Bus Buffers/Switches.

In one embodiment, a CMD/CTRL buffer and a data bus buffer/switch are disposed on separate integrated circuit chips. To reduce the pins used to route the control signals from the CMD/CTRL buffer to the data bus buffer/switch, the control signals are encoded and routed as encoded signals (DBS).

The CMD/CTRL buffer (101) can be designed to have the same pin out as the conventional Register Buffer, which buffers and re-drives the control signals, command signals, address signals and clock signals. In this case, the control signals DBS[S-1:0] (where, S is the number of the control signals) can be output via the reserved pins or some multiplexed pins of the Register Buffer. The CMD/CTRL buffer (101) can also be designed to have some additional pins dedicated for the DBS[S-1:0] signals, in comparison with a conventional Register Buffer.

In FIG. 4, the DBS generator (103) uses a DBS encoder (107) to extract DRAM commands (e.g., write, read, etc.) and then encodes them to compress the width of control signals and to reduce the pin count of an integrated circuit chip containing the CMD/CTRL buffer and an integrated circuit chip containing the data bus buffer switch and thus to simplify the routing between them. In some embodiments, the DBS signal is routed to the data bus buffer/switch (e.g., 41 or 71) which decodes the encoded signals and uses the encoded signals to control the operation of the corresponding DRAM chips (e.g., 51, 53, ..., 55, 57; or 81, 83, ..., 85, 87). In some embodiments, when the DBS signal is decoded and used by the data bus buffer/switch, it is not necessary to use some of the re-driven command, address, control, clock signals; and thus, it is not necessary for the register buffer (105) to re-drive some of the command, address, control, clock signals that are encoded in the DBS signal. In some embodiments, the register buffer (105) may have a first mode to re-drive the command, address, control, clock signals using the pins in a way same as a conventional register buffer, and a second mode to re-drive some of the command, address, control, clock signals and drive the DBS signals over the same set of pins of a conventional register buffer.

In one embodiment, the CMD/CTRL buffer (101) takes the same input as a conventional register buffer. In another embodiment, the CMD/CTRL buffer (101) can take additional control signals as input, in additional to the inputs to a conventional register buffer. For example, the additional control signals can be used to control the mode of the register buffer (105).

In one embodiment, the DBS generator (103) uses the chip select signals (DCS[3:0]) to generate at least a portion of the DBS signal to control the connectivity between the DRAM chips and the data bus.

In one embodiment, based on the command, control, address, and/or clock signals, the scheduler (109) of the DBS generator (103) extracts the DRAM configuration information, such as write latency, read latency, etc., to generate buffer timing control signal to adjust the timing of the DBS signal.

Figure 5:
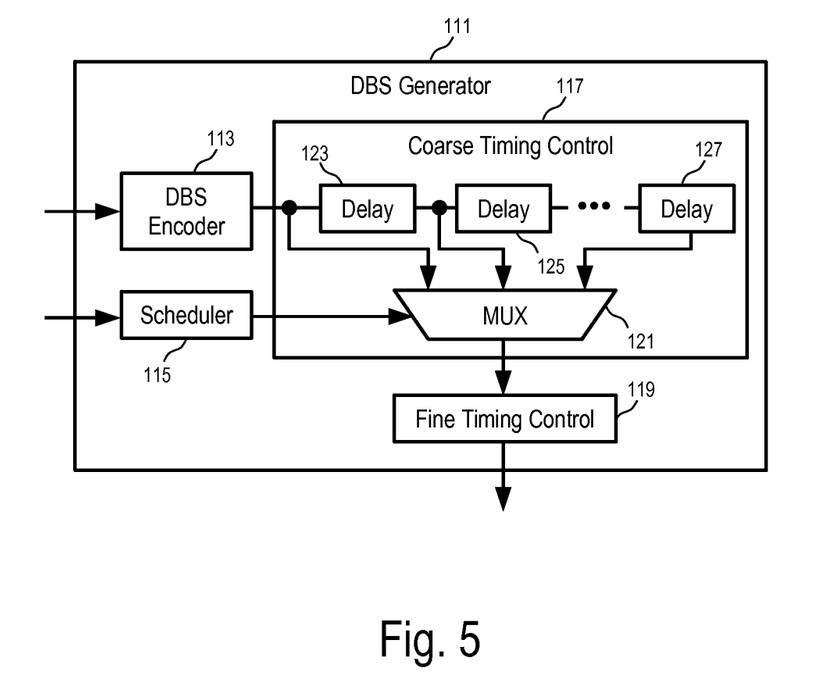
FIG. 5 shows a DBS generator of a command/control buffer according to one embodiment.

FIG. 5 shows a DBS generator of a command/control buffer according to one embodiment. In FIG. 5, under the control of the scheduler (115), the output of the DBS encoder (113) of the DBS generator (111) is adjusted in timing by a coarse timing control (117) and a fine timing control (119).

The coarse timing control (117) has a delay chain, including a plurality of delay elements (123, 125, . . . , 127). Based on the analysis of the Cmd/Addr/Ctrl/Clk signals, the scheduler (115) controls the multiplexer (121) to select the signals from an appropriate delay stage to be output to the fine timing control (119). The signals selected by the multiplexer (121) are further processed by the fine timing control (119) and then output as the control signals DBS[S-1:0] for data bus buffers/switches.

In one embodiment, the coarse timing control (117) applies a delay that is equal to one or more clock cycles; and the fine timing control (119) applies a delay that is a fraction of a clock cycle. The fine timing control (119) is used to provide an improved timing match between the data path and the DBS control path. The fine timing control (119) may be implemented using a delay chain and a multiplexer, or one or more adjustable delays. In one embodiment, the outputs of the fine timing control may also include signals for write enable (WR_EN), read enable (RE_EN), and on die termination (ODT), etc.

In one embodiment, the delay of the fine timing control (119) is predetermined. In another embodiment, the delay of the fine timing control (119) is programmable.

Figure 6:
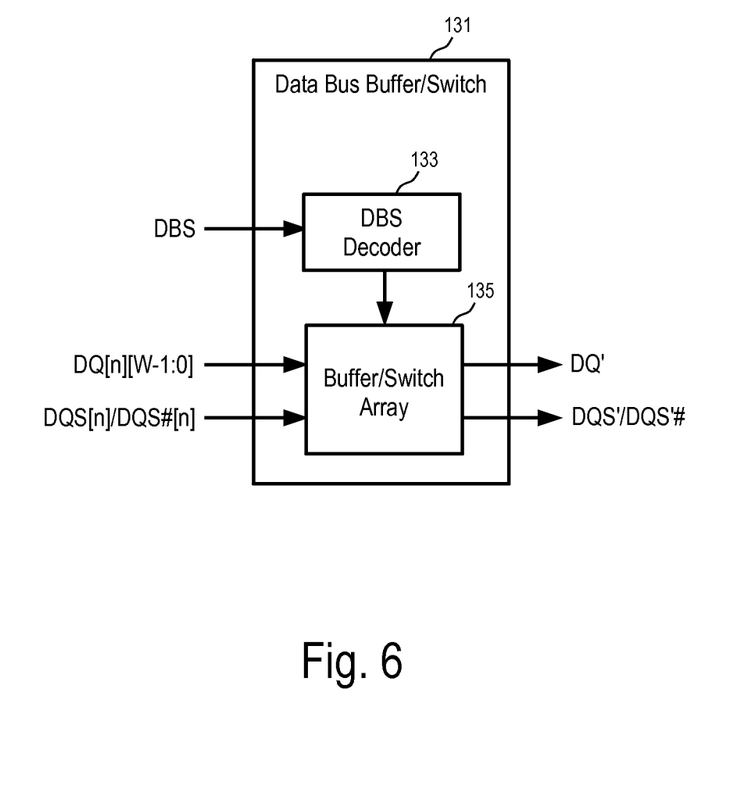
FIG. 6 shows a data bus buffer or switch according to one embodiment.

FIG. 6 shows a data bus buffer or switch according to one embodiment. In FIG. 6, the DBS signal is the control signals received in the data bus buffer/switch (131) from the CMD/CTRL buffer (e.g., 23). DQ[n][W-1:0] represents a group of data signals; and DQS[n]/DQS#[n] represents the strobe signal pair for the corresponding group of data signals, where n=0, 1, . . . , N-1.

If the Data Bus Buffer/Switch (131) is a buffer, it outputs only one signal for each of the DQ and DQS signals for the DRAM chip group; and the same output is to be connected to all of the corresponding DRAM chips in the group (i.e., the same signal is connected to DRAM chips in different ranks), as illustrated in FIG. 3. Alternatively, if the Data Bus Buffer/Switch (131) is a buffer, it may output R copies of signals for each of the DQ and DQS signals for each of the DRAM chips in the group, where R is the number of ranks on a module. The R copy of the output signals are to be connected to DRAM chips in different ranks separately, as illustrated in FIG. 2. Alternatively, if the Data Bus Buffer/Switch (131) is a buffer, it may communicate with one of the R DRAM chips over the point to point connections, as illustrated in FIG. 2.

If the Data Bus Buffer/Switch (131) is a switch, it selectively connects the data bus signal lines to one of the R copies of the corresponding signal lines for each of the DQ and DQS signals for each of the DRAM chips in the group, where R is the number of ranks on a module. The data bus signal lines are to be connected to DRAM chips in different ranks separately. For example, as illustrated in FIG. 2, when the data bus switch (41) connects the data bus signal lines DB[0][W-1:0] to the DRAM[0][0], the data bus switch (41) disconnects other DRAM chips in the group (e.g., 53, . . . , 55, 57) from the data bus signal lines DB[0][W-1:0].

Figure 7:
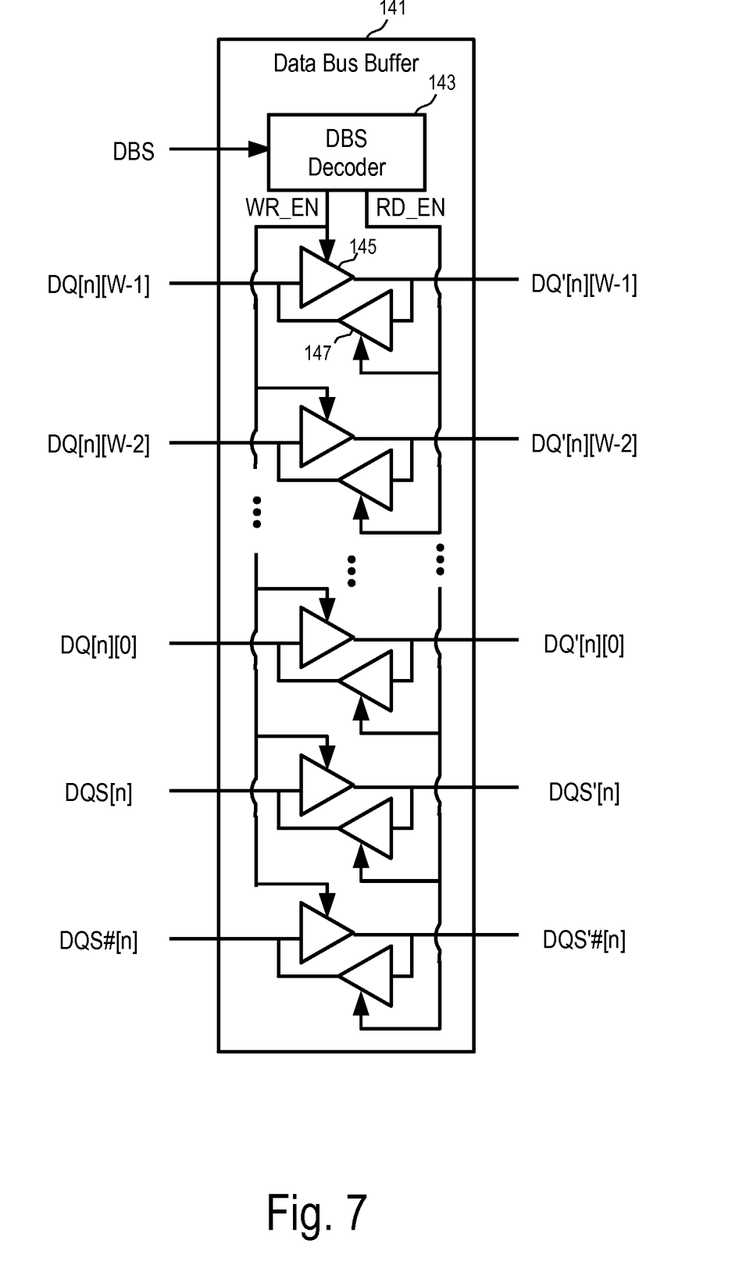
FIG. 7 shows a data bus buffer according to one embodiment.

FIG. 7 shows a data bus buffer according to one embodiment. In FIG. 7, the DBS[S-1:0] signals are decoded and used as read enable and write enable signals to control the direction of the data flow in the data bus. For example, in FIG. 7, the DBS decoder (143) of the data bus buffer (141) decodes the DBS signal received from a CMD/CTRL buffer to generate the signals corresponding to write enable and read enable.

When the write enable signal is on, the data bus buffer (141) buffers the data received from the data bus signal lines and drives the received data to the bus connecting the group of DRAM chips. For example, when the write enable signal is on, the buffer (145) is used to buffer the data received from the data bus signal DQ[n][W-1] and drives the corresponding signal line for a group of DRAM chips (e.g., 81, 83, . . . , 85, 87 in FIG. 3).

When the read enable signal is on, the data bus buffer (141) buffers the data received from the bus connecting the group of DRAM chips and drive received data on the data bus signal lines. For example, when the read enable signal is on, the buffer (147) is used to buffer the data received from corresponding signal line for a group of DRAM chips (e.g., 81, 83, . . . , 85, 87 in FIG. 3) and drives the received data on the data bus signal DQ[n][W-1].

FIG. 7 illustrates a data bus buffer (141) that uses a one to many connections to the DRAM chips in a way as illustrated in FIG. 3. Alternatively, a data bus buffer (141) may also use a buffer array to drive one-to-one connections to the DRAM chips in a way as illustrated in FIG. 2.

Figure 8:
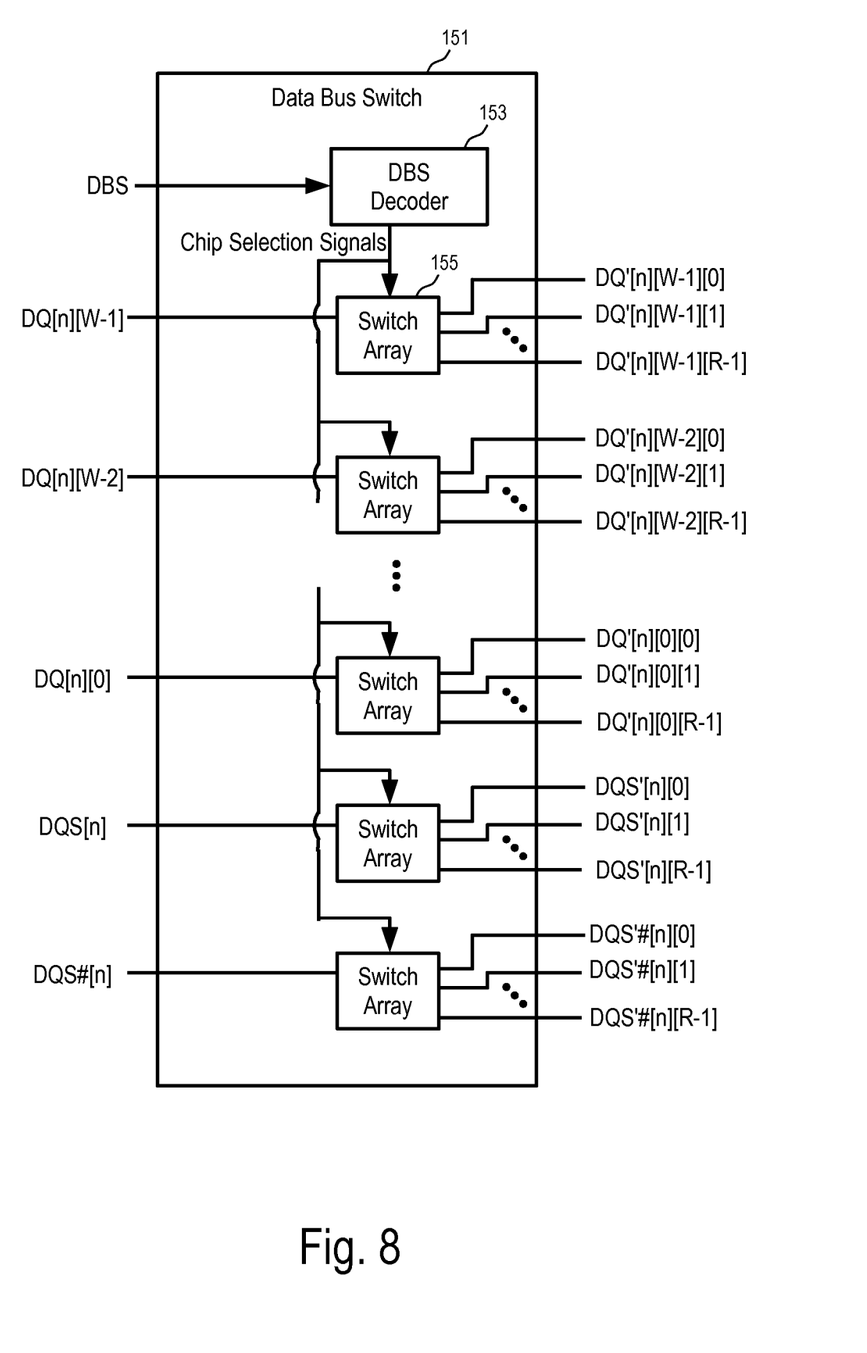
FIG. 8 shows a data bus switch according to one embodiment.
Figure 9:
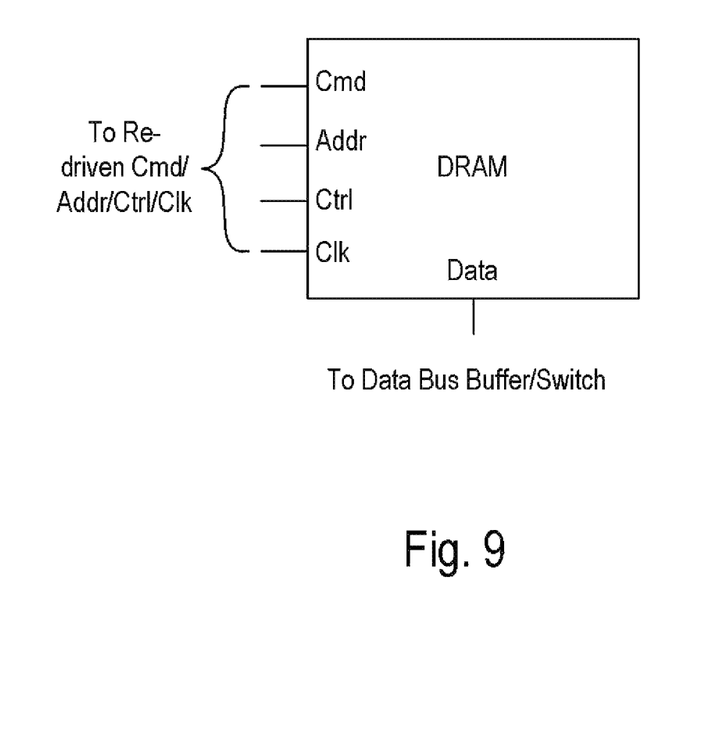
FIG. 9 illustrates the connections of a typical DRAM chip as used in FIGS. 2 and 3.

FIG. 8 shows a data bus switch according to one embodiment. In FIG. 8, the DBS[S-1:0] signals are decoded and used as chip selects to enable the target Switch while disable the remaining switches. For example, in FIG. 8, the DBS decoder (143) of the data bus buffer (141) decodes the DBS signal received from a CMD/CTRL buffer to generate the chip selection signal. The chip selection signal determines one of the DRAM chips in a group that is connected to the data bus signal line; and other DRAM chips in the group are disconnected from the data bus signal line.

For example, when the chip selection signal selects rank 0, the data bus signal line DQ[n][W-1] is connected by the switch array (155) to the signal line DQ'[n][W-1][0], which is connected via a point to point connection to a rank 0 DRAM chip in the group (e.g., DRAM[n][0] (51) in FIG. 2). When the chip selection signal selects rank 1, the data bus signal line DQ[n][W-1] is connected by the switch array (155) to the signal line DQ'[n][W-1][1], which is connected via a point to point connection to a rank 1 DRAM chip in the group (e.g., DRAM[n][1] (53) in FIG. 2).

Thus, in at least one embodiment, a new device Data Bus Buffer/Switches is introduced on a registered DIMM module to buffer the data bus and re-drive the data to the DRAM chips. Further, an upgraded register buffer (now called CMD/CTRL Buffer) is used to generate control signals for the Data Bus Buffer/Switches. Thus, the speed and capacity supported by the memory system can be increased.

In the foregoing specification, the disclosure has been provided with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A registered Dual In-line Memory Module, comprising:
    a printed circuit board having a plurality of electrical contacts for connection to a data bus;
    a plurality of memory chips mounted on the printed circuit board, the memory chips having pins for address and control signals, and data pins that are separate from the pins for address and control signals;
    a control buffer having a register buffer configured to receive, buffer and re-drive address and control signals to the memory chips, and a control signal generator configured to generate an encoded control signal based on address and control signals received in the register buffer; and
    an electrical load reduction circuit coupled between the electrical contacts and the data pins of the memory chips and configured to at least one of receive first data via the electric contacts from the data bus and write the first data via the data pins into the memory chips, and read second data via the data pins from the memory chips and place the second data via the electric contacts onto the data bus;

wherein the electrical load reduction circuit is coupled between the electric contacts and the data pins of the memory chips to cause an electrical load of the memory chips on the data bus being smaller with the memory chips being coupled to the data bus via the electrical load reduction circuit than connecting the memory chips directly to the data bus; and wherein the electrical load reduction circuit includes a buffer or switch array coupled between the electrical contacts and the data pins of the memory chips, and a decoder configured to receive the encoded control signal from the control signal generator, and decode the encoded control signal to control the buffer or switch array of the electrical load reduction circuit to communicate data to or from the data pins of the memory chips.

2. The memory module of claim 1, wherein the electrical load reduction circuit comprises a data bus buffer to buffer data transmitted between the memory chips and the data bus.

3. The memory module of claim 2, wherein the data bus buffer drives a bit of data received from the data bus to multiple of the memory chips via multiple one to one connections provided on the printed circuit board.

4. The memory module of claim 2, wherein the data bus buffer drives a bit of data received from the data bus to multiple of the memory chips via a one to many connection provided on the printed circuit board.

5. The memory module of claim 1, wherein the electrical load reduction circuit comprises a data bus switch which selectively couples the data bus to a subset of the memory chips and isolates a subset of the memory chips from the data bus.

6. A memory system, comprising:
a data bus;
a memory controller coupled to the data bus; and
at least one Dual In-line Memory Module (DIMM) having
a plurality of memory chips having
pins for address and control signals and
data pins that are separate from the pins for address and control and
an electrical load reduction circuit coupled between the data bus and the data pins of the memory chips, the data bus to transmit data into or from the memory chip via the electrical load reduction circuit, the electrical load reduction circuit to enable the memory controller to access the memory chips with an electrical load smaller than connecting the memory chips to the data bus without the electrical load reduction circuit.

7. The memory system of claim 6, further comprising:
a register buffer mounted on the DIMM and connected to a control bus to buffer control signals from the memory controller to the memory chips.

8. The memory system of claim 7, wherein the control signals include chip selection signals.

9. The memory system of claim 8, further comprising:
a control signal generator mounted on the DIMM to generate a control signal for the electrical load reduction circuit according to the control signals received in the register buffer.

10. The memory system of claim 9, wherein the control signal generator and the electrical load reduction circuit are disposed in separate integrated circuit chips; and the control signal generator includes an encoder to compress a plurality of signals for transmission over a plurality of control lines between the separate integrate circuit chips.

11. The memory system of claim 10, wherein the electrical load reduction circuit buffers data from the data bus.

12. The memory system of claim 10, wherein the electrical load reduction circuit comprises a switch array to selectively couple a portion of the memory chips to the data bus.

13. An integrated circuit chip, comprising:
a register buffer to buffer and re-drive command, address, control and clock signals to non-data pins of memory chips from a memory bus comprising a data bus; and
an encoder to generate a control signal for a circuit, the circuit coupled between the data bus and data pins of the memory chips that are separate from the non-data pins of the memory chips to buffer the data bus or to selectively couple the data pins of the memory chips to the data bus.

14. The integrated circuit chip of claim 13, further comprising:
a scheduler to control timing of an output of the encoder.

15. The integrated circuit chip of claim 14, further comprising:
a first timing control coupled with the scheduler to delay the output of the encoder one or more clock cycles; and
a second timing control coupled with the first time control to delay the output of the encoder a fraction of a clock cycle.

16. The integrated circuit chip of claim 15, wherein the first timing control comprises a delay chain and a multiplexer.

17. The integrated circuit chip of claim 13, wherein the encoder compresses a plurality of control signals for transmission over a reduced number of pins of the integrated circuit chip.

* * * * *